United States Patent
Cattell et al.

(10) Patent No.: US 11,447,193 B2
(45) Date of Patent: Sep. 20, 2022

(54) CONTROL OF VEHICLE AERODYNAMIC FORCE FOR HYDROPLANING MITIGATION

(71) Applicant: GM Global Technology Operations LLC, Detroit, MI (US)

(72) Inventors: Dale Cattell, Royal Oak, MI (US); Jason D. Fahland, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 666 days.

(21) Appl. No.: 16/436,232

(22) Filed: Jun. 10, 2019

(65) Prior Publication Data

US 2020/0385070 A1 Dec. 10, 2020

(51) Int. Cl.
  *B62D 37/02* (2006.01)
  *B62D 35/00* (2006.01)
  *B62D 35/02* (2006.01)
  *B62D 25/12* (2006.01)

(52) U.S. Cl.
  CPC ............. *B62D 37/02* (2013.01); *B62D 25/12* (2013.01); *B62D 35/005* (2013.01); *B62D 35/007* (2013.01); *B62D 35/02* (2013.01)

(58) Field of Classification Search
  CPC ...... B62D 37/02; B62D 25/12; B62D 35/005; B62D 35/007; B62D 35/02
  See application file for complete search history.

(56) References Cited

U.S. PATENT DOCUMENTS

| | | | | |
|---|---|---|---|---|
| 5,765,119 A | * | 6/1998 | Otabe | B60T 8/172 701/80 |
| 8,979,102 B1 | * | 3/2015 | Prentice | B62D 25/186 280/124.1 |
| 9,333,994 B1 | * | 5/2016 | Fahland | G05D 3/00 |
| 10,189,513 B2 | * | 1/2019 | Heil | B62D 35/00 |

(Continued)

FOREIGN PATENT DOCUMENTS

| | | | | |
|---|---|---|---|---|
| CN | 1634720 A | * | 7/2005 | |
| DE | 10102633 A1 | * | 8/2002 | B62D 35/005 |

(Continued)

*Primary Examiner* — Peter D Nolan
*Assistant Examiner* — Kenneth M Dunne
(74) *Attorney, Agent, or Firm* — Quinn IP Law

(57) ABSTRACT

A system is configured to mitigate hydroplaning of a vehicle having an adjustable aerodynamic-aid element configured to generate a selectable downforce on the vehicle body in response to a movement of ambient airflow relative thereto. The system includes a mechanism for varying a position of the adjustable aerodynamic-aid element relative to the body to regulate the downforce and sensor(s) configured to detect a vehicle dynamic parameter indicative of hydroplaning of the vehicle. The system additionally includes an electronic controller in communication with the sensor(s) and programmed to regulate the mechanism. The controller is configured to determine a target position for the adjustable aerodynamic-aid element in response to signal(s) from the sensor(s). The controller is also configured to set the adjustable aerodynamic-aid element to the target position via the mechanism to regulate the downforce on the vehicle body and mitigate the hydroplaning of the vehicle.

14 Claims, 3 Drawing Sheets

(56) References Cited

U.S. PATENT DOCUMENTS

| | | | | |
|---|---|---|---|---|
| 2008/0077295 A1* | 3/2008 | Holzmann | ............ | B62D 6/006 |
| | | | | 701/43 |
| 2011/0181072 A1* | 7/2011 | Kempster | ............ | B62D 35/001 |
| | | | | 296/180.5 |
| 2014/0195118 A1* | 7/2014 | Okubo | ............ | B62D 6/04 |
| | | | | 701/41 |
| 2017/0057566 A1* | 3/2017 | Hommes | ............ | G07C 5/0808 |
| 2017/0088200 A1* | 3/2017 | Heil | ............ | B62D 37/02 |
| 2017/0158259 A1* | 6/2017 | Fahland | ............ | B62D 37/02 |
| 2020/0385070 A1* | 12/2020 | Cattell | ............ | B62D 35/02 |

FOREIGN PATENT DOCUMENTS

| | | | | |
|---|---|---|---|---|
| DE | 102005021832 A1 * | 11/2006 | ............ | B60T 1/16 |
| DE | 202008009704 U1 * | 12/2009 | ............ | B62D 35/007 |
| EP | 0591930 A1 * | 4/1994 | ............ | G01P 1/122 |
| EP | 2631161 A1 * | 8/2013 | ............ | B62D 35/007 |
| FR | 2897038 A1 * | 8/2007 | ............ | B62D 35/005 |
| JP | H04131587 U * | 12/1992 | | |
| JP | H05105059 A * | 4/1993 | ............ | B60T 2210/13 |
| JP | 2007253929 A * | 10/2007 | ............ | B62D 25/161 |
| JP | 2010143530 A * | 7/2010 | | |
| WO | WO-0102235 A1 * | 1/2001 | ............ | B62D 35/007 |

* cited by examiner

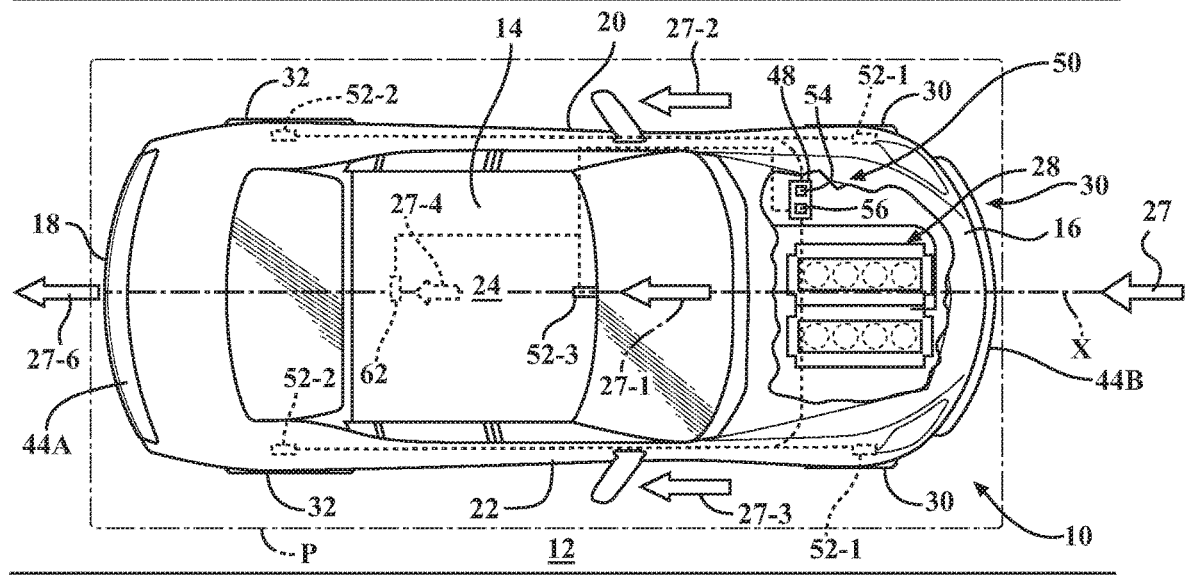
FIG. 1
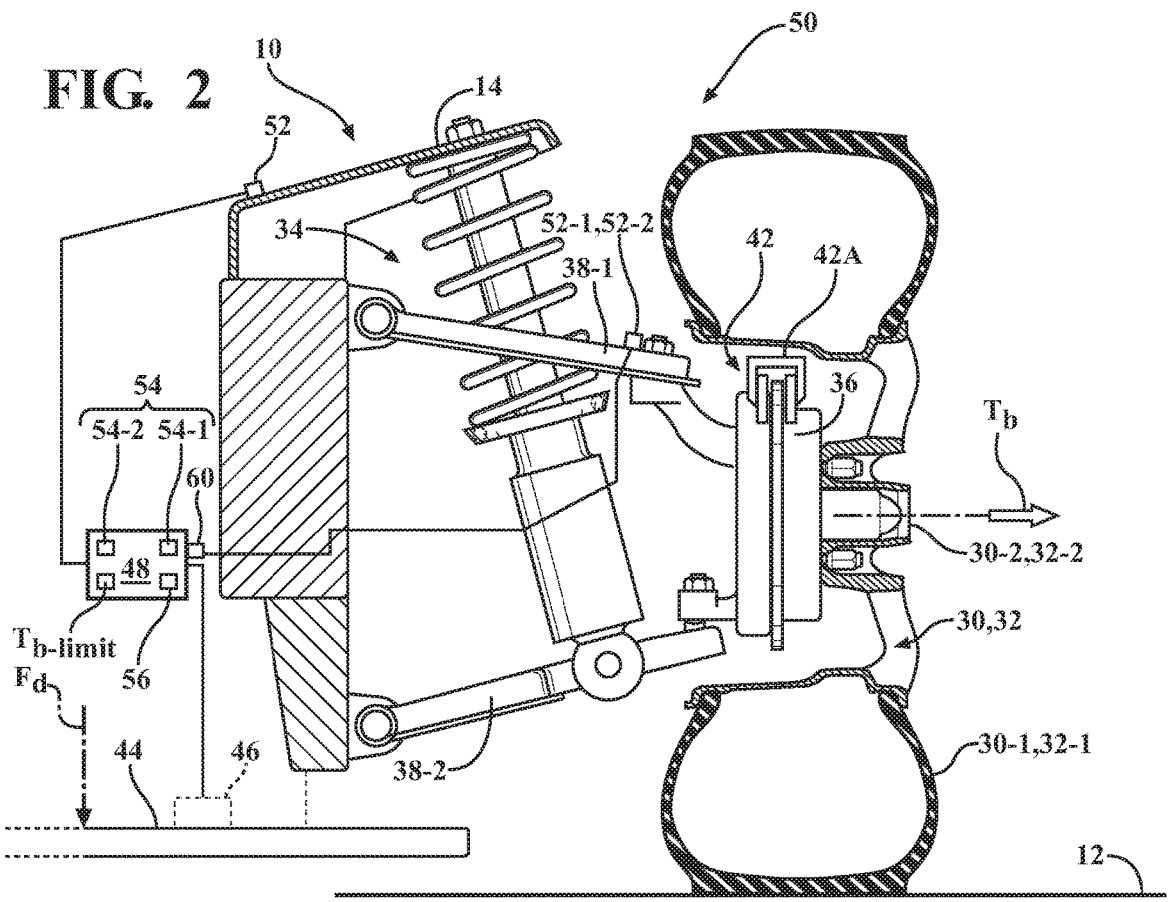

CONTROL OF VEHICLE AERODYNAMIC FORCE FOR HYDROPLANING MITIGATION

INTRODUCTION

The disclosure relates to mitigation of vehicle hydroplaning through control of the vehicle's aerodynamic force.

Aerodynamics is a significant factor in vehicle design, including automobiles. Automotive aerodynamics is the study of the aerodynamics of road vehicles. The main goals of the study are reducing drag and wind noise, minimizing noise emission, and preventing undesired lift forces and other causes of aerodynamic instability at high speeds.

The study is typically used to shape vehicle bodywork along with employing dedicated aerodynamic devices for achieving a desired compromise among the above characteristics for specific vehicle use. Additionally, the study of aerodynamics may also be used to achieve downforce in vehicles in order to improve vehicle traction, high speed stability, and cornering.

Generally, hydroplaning of a vehicle is a result of loss of traction on a wet road surface when the vehicle's tires encounter more water than the tire tread is capable of channeling from under the tires. Hydroplaning typically takes place at high speeds when water builds up at the front of the tires, thus causing the tires to ride up on the water.

SUMMARY

A system is configured to mitigate hydroplaning of a vehicle having a vehicle body with a front end facing oncoming ambient airflow. The system includes an adjustable aerodynamic-aid element mounted to and configured to generate a selectable downforce on the vehicle body in response to a movement of the ambient airflow relative to the vehicle body. The system also includes a mechanism configured to vary a position of the adjustable aerodynamic-aid element relative to the vehicle body and thereby regulate the downforce. The system additionally includes at least one sensor arranged on the vehicle and configured to detect a vehicle dynamic parameter indicative of hydroplaning of the vehicle. The system further includes an electronic controller in communication with the at least one sensor and programmed to regulate the mechanism. The electronic controller is configured to receive a signal from the at least one sensor indicative of the detected hydroplaning of the vehicle and determine a target position for the adjustable aerodynamic-aid element in response thereto. The electronic controller is also configured to set the adjustable aerodynamic-aid element to the target position via the mechanism to regulate the downforce on the vehicle body and mitigate the hydroplaning of the vehicle.

The vehicle may include a front wheel and a rear wheel. Additionally, the sensor(s) may include a front speed sensor in communication with the electronic controller and configured to detect a speed of the front wheel and a rear speed sensor in communication with the electronic controller and configured to detect a speed of the rear wheel. In such an embodiment, the controller may be configured to determine a gradient of the speed of the front wheel and a gradient of the speed of the rear wheel.

The vehicle may include a braking system configured to retard rotation of the front and rear wheels. In such an embodiment, the electronic controller may be configured to determine a value of brake torque applied to the front wheel by the braking system and set the adjustable aerodynamic-aid element to the target position when the determined value of brake torque is less than a calibratable brake torque limit.

The braking system may include an anti-lock braking system (ABS). In such an embodiment, the electronic controller may be configured to set the adjustable aerodynamic-aid element to the target position when the ABS is not active.

The electronic controller may additionally be configured to determine a difference between the gradient of the speed of the front wheel and the gradient of the speed of the rear wheel. The electronic controller may also be configured to compare the determined difference between the gradient of the speed of the front wheel and the gradient of the speed of the rear wheel to a first calibratable limit value. The electronic controller may be further configured to set the adjustable aerodynamic-aid element to the target position when the determined difference between the gradient of the speed of the front wheel and the gradient of the speed of the rear wheel is greater than the first calibratable limit value.

The electronic controller may also be configured to determine a proportion of the gradient of the speed of the front wheel to the gradient of the speed of the rear wheel. The electronic controller may be additionally configured to compare the determined proportion of the gradient of the speed of the front wheel to the gradient of the speed of the rear wheel to a second calibratable limit value. The electronic controller may be further configured to set the adjustable aerodynamic-aid element to the target position when the determined proportion of the gradient of the speed of the front wheel to the gradient of the speed of the rear wheel is less than the second calibratable limit value.

The electronic controller may be additionally configured to determine a speed of the vehicle and compare the speed of the front wheel to the determined vehicle speed. The electronic controller may be further configured to determine a difference between the speed of the front wheel and the determined vehicle speed, and then divide the determined difference between the speed of the front wheel and the determined vehicle speed by the determined vehicle speed to establish a front wheel speed to vehicle speed comparison value. The electronic controller may be configured to set the adjustable aerodynamic-aid element to the target position when the established front wheel speed to vehicle speed comparison value is less than a third calibratable limit value.

The electronic controller may be configured to determine the speed of the vehicle via a mathematical calculation.

The at least one sensor may include a vehicle speed sensor configured to detect a velocity of ambient airflow relative to the vehicle and communicate the detected velocity of the ambient airflow to the controller.

The adjustable aerodynamic-aid element may be an adjustable-position spoiler, an adjustable-position splitter, an extendible air dam, an adjustable-position diffuser, adjustable-position dive planes, a front wheel-well radiator intake or exhaust opening, and a variable-position shutter.

The vehicle may also include a second vehicle body end opposite the first body end. Furthermore, the aerodynamic-aid element may be positioned proximate either the first body end or the second body end. Additionally, the controller may be configured to vary the magnitude of the aerodynamic downforce generated by the aerodynamic-aid element on one of the first vehicle body end and the second vehicle body end via regulation of the mechanism.

A vehicle employing the above-described system and a method of mitigating hydroplaning of such a vehicle are also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 1 is a schematic top view of a vehicle having a vehicle body arranged in a body plane and along a longitudinal axis, and having a plurality of adjustable aerodynamic-aid elements and a system for mitigating hydroplaning of the vehicle, according to the disclosure.

FIG. 2 is an enlarged schematic cross-sectional illustration of a representative suspension corner of the vehicle shown in FIG. 1, according to the disclosure.

DETAILED DESCRIPTION

Figure 3:
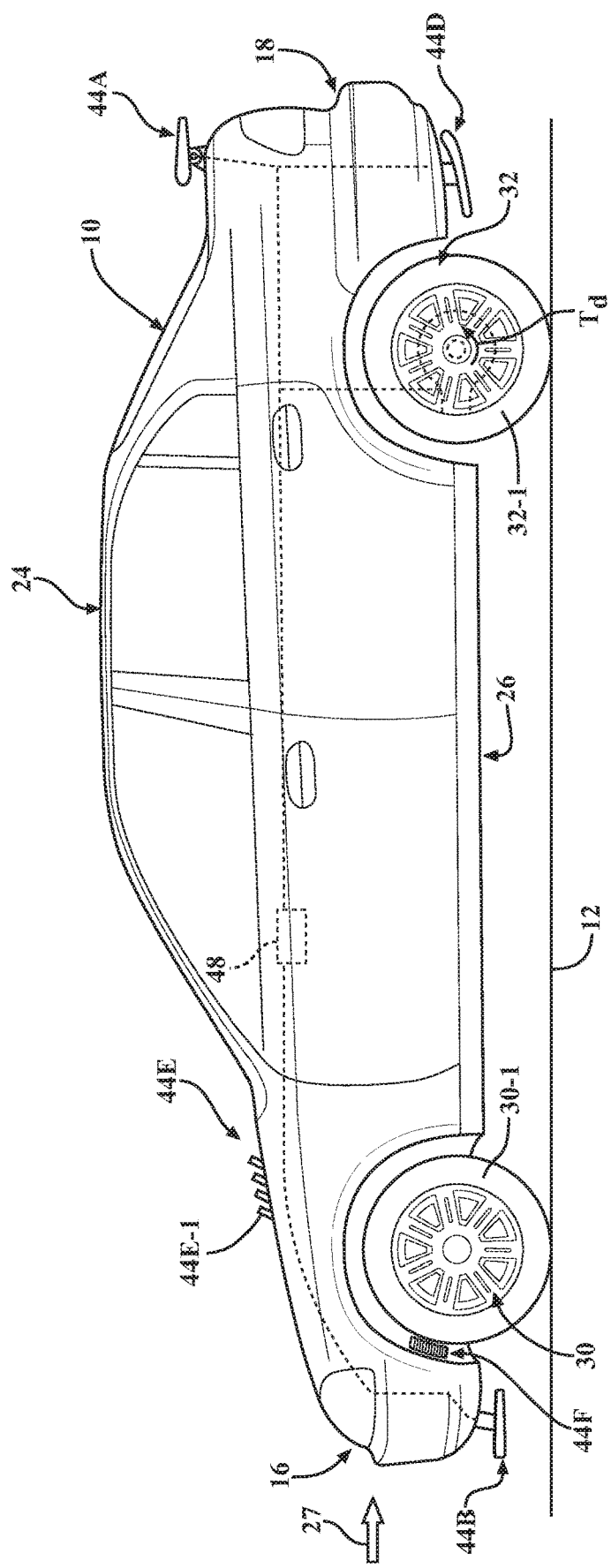
FIG. 3 is a schematic side view of the vehicle shown in FIG. 1 according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged along a virtual longitudinal axis X in a body plane P that is substantially parallel to the road surface 12. The vehicle body 14 defines six body sides. The six body sides include a first body end or front end 16, a second body end or rear end 18 arranged opposite the front end, a first lateral body side or left side 20, and a second lateral body side or right side 22, a top body portion 24, which may include a vehicle roof, shown in FIG. 1, and an underbody portion 26, shown in FIG. 3.

The left side 20 and right side 22 are disposed generally parallel to each other and with respect to the longitudinal axis X, and span the distance between the front end 16 and the rear end 18. The body plane P is defined to include the longitudinal axis X. A passenger compartment (not shown) of the vehicle 10 is generally bounded by the front and rear ends 16, 18 and the left and right sides 20, 22 of the body 14. As may be seen from FIG. 1, the front end 16 is configured to face an oncoming ambient airflow 27 when the vehicle 10 is in motion relative to the road surface 12. When the vehicle 10 is in motion, the oncoming ambient airflow 27 moves substantially parallel to the body plane P and along the longitudinal axis X.

As shown, the vehicle 10 also includes a powerplant 28, such as an internal combustion engine, a hybrid-electric powertrain (not shown), or other alternative types of propulsion systems. As the vehicle 10 moves relative to the road surface 12, for example under torque input from the powerplant 28, the ambient airflow 27 passes around the vehicle body 14 and splits into respective first airflow portion 27-1, second airflow portion 27-2, third airflow portion 27-3, and fourth airflow portion 27-4, that eventually rejoin in a wake area or recirculating airflow region 27-6 immediately behind the rear end 18. Specifically, as shown in FIG. 1, the first airflow portion 27-1 passes over the top body portion 24, second airflow portion 27-2 passes over the left side 20, third airflow portion 27-3 passes over the right side 22, and fourth airflow portion 27-4 (shown in phantom in FIG. 1) passes under the vehicle body 14, between the underbody portion 26 and the road surface 12. As understood by those skilled in the art, the recirculating airflow region 27-6 is generally caused at elevated vehicle speeds by the flow of surrounding air around the six body sides of the vehicle body 14

The vehicle 10 also includes a plurality of road wheels that include front wheels 30 and rear wheels 32. The vehicle 10 may be configured such that one or more of the road wheels 30, 32 is driven via a respective drive axle, i.e., receives torque input from the powerplant 28, for propelling the vehicle. As shown, each road wheel 30, 32 may have a pneumatic tire mounted thereon. Specifically, in the case of the four wheeled vehicle 10 shown, a pair of front wheels 30 arranged proximate the front end 16 and a pair of rear wheels 32 arranged proximate the rear end 18, include front tires 30-1 and rear tires 32-1 mounted on the respective front and rear wheels. Although four wheels, i.e., a pair of front wheels 30 and a pair of rear wheels 32, are shown in FIG. 1, a vehicle with fewer or greater number of wheels is also envisioned. As shown in FIG. 2, a vehicle suspension system, indicated generally at 34, operatively connects the body 14 to the front and rear wheels 30, 32 for maintaining contact between the wheels and a road surface 12, and for maintaining handling of the vehicle.

The suspension system 34 includes a plurality of knuckles 36, each configured to support a respective road wheel 30, 32 via a wheel hub 30-2, 32-2 and a bearing assembly (not shown). As shown, each knuckle 36 may be operatively connected to the body 14 via an upper control arm 38-1 and a lower control arm 38-2. FIG. 2 depicts a representative suspension corner 40 operatively connected to one of the front and rear road wheels 30, 32 of the suspension system 34. As shown, the representative corner 40 includes a representative knuckle 36, and may include each of the control arms 38-1 and 38-2. Other suspension designs employing individual suspension corners at specific road wheels are also envisioned. As shown, the vehicle 10 includes a braking system 42 employing friction brakes 42A configured to retard rotation of the front and rear wheels 30, 32. An individual friction brake 42A is mounted to a respective wheel hub 30-2, 32-2 and is operable to apply a brake torque $T_b$ thereto to slow motion of the vehicle 10 relative to the road surface 12.

The vehicle 10 also includes an adjustable aerodynamic-aid element generically shown and identified via a numeral 44 in FIG. 2. The adjustable aerodynamic-aid element 44 is mounted to the vehicle body 14. The adjustable aerodynamic-aid element 44 may, for example, take the form of an adjustable-position spoiler 44A (shown in FIGS. 1 and 3), an adjustable-position splitter 44B (shown in FIGS. 1 and 3), an extendible air dam 44C (shown in FIG. 4), an adjustable-position diffuser 44D (shown in FIG. 3), a variable-position shutter 44E (shown in FIG. 3) arranged on a vehicle hood and having moveable louvers 44E-1 that may be shifted between opened and closed positions, or a variable-position shutter 44F arranged in a wheel-well radiator intake or exhaust opening (shown in FIG. 3). As such, the adjustable aerodynamic-aid element 44 may be positioned either on the front end 16 or the rear end 18 of the vehicle 10. Each aerodynamic-aid element 44 may be adjusted relative to the vehicle body 14 via a respective mechanism 46. The mechanism 46 is configured to vary a position of the adjustable aerodynamic-aid element 44 relative to the vehicle body 14. Such variation of the position of the respective aerodynamic-aid element 44 is configured to control a movement of the ambient airflow 27 relative to the vehicle body 14 and may vary a downforce $F_d$ generated by the airflow thereon.

In other words, the adjustable aerodynamic-aid element(s) 50 is configured to generate a selectable downforce $F_d$ on the vehicle body 14 in response to movement of the ambient airflow 27. The downforce $F_d$ is also herein defined as the aerodynamic force applied to the vehicle body 14 that acts in a direction normal to the body plane P and counters lift of the vehicle body at elevated road speeds. Each mechanism 46 may include an electric motor or another type of an actuator, as will be described in more detail below.

As shown in FIGS. 1-4, the vehicle also includes an electronic controller 48 configured, i.e., constructed and programmed, to regulate the mechanism 46. The controller 48 may be configured as a central processing unit (CPU) configured to regulate operation of the powerplant 28, or a dedicated controller. In order to appropriately control operation of the mechanism 46, the controller 48 includes a memory, at least some of which is tangible and non-transitory. The memory may be a recordable medium that participates in providing computer-readable data or process instructions. Such a medium may take many forms, including but not limited to non-volatile media and volatile media.

Non-volatile media for the controller 48 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 48 may also include a flexible disk, hard disk, magnetic tape, other magnetic medium, a CD-ROM, DVD, other optical medium, etc. The controller 48 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 48 or accessible thereby may be stored in the memory and automatically executed to provide the required functionality.

Figure 4:
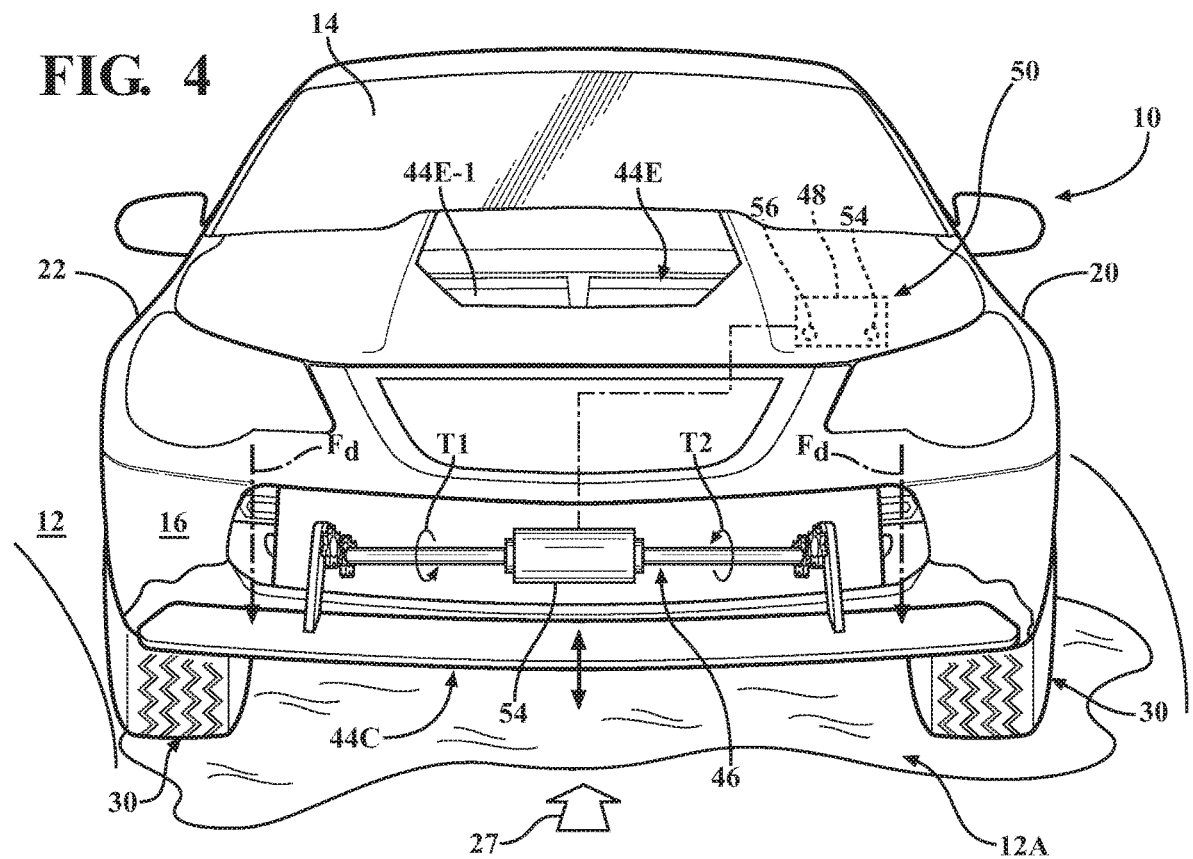
FIG. 4 is a schematic partial cut-away front view of the vehicle shown in FIG.1, illustrating hydroplaning of the vehicle, according to the disclosure.

The controller 48 is configured to regulate each mechanism 46 to thereby vary the position of the respective adjustable aerodynamic-aid element 44 relative to the vehicle body 14. Each mechanism 46 may include a suitable device for generating movement of the aerodynamic-aid element 44, such as a linear actuator and/or an electric motor (not shown). The mechanism 46 may also include a gear drive, such as a reduction gear-set, which may be coupled to the device, such as the linear actuator or electric motor, in order to affect desired movement of the aerodynamic-aid element 44 relative to the vehicle body 14. For example, as shown in FIG. 4, the particular mechanism 46 may be configured to apply a torque T1 to change position of the air dam 44C in one direction, for example to lower the air dam, and an opposite torque T2 to shift the air dam in the opposite direction. Similar principle of actuation may be applied to other aerodynamic-aid elements 44 via respective mechanisms 46.

The vehicle 10 additionally includes a system 50 for mitigation of hydroplaning of the vehicle. In a motor vehicle, such as the vehicle 10, hydroplaning is a result of loss of traction on a wet road surface when the vehicle's tires encounter more water than the tire tread is capable of channeling out from under the tires, for example a deep puddle 12A shown in FIG. 4. Hydroplaning typically takes place at high speeds when water displaced by the tires builds up at the front of the tires. Thus displaced, water pushes the tires away from the road surface and generates a thin water film between the tire and the road.

The system 50 includes one or more of the adjustable aerodynamic-aid elements 44. Specifically, the system 50 is configured to mitigate hydroplaning of the vehicle 10 through control of the downforce $F_d$ via the adjustable aerodynamic-aid element(s) 44 using the ambient airflow 27. More specifically, downforce $F_d$ may be used to press the tires mounted to the front and/or the rear wheels 30, 32 of the vehicle 10 through the water film and into contact with the road surface 12. To such an end, the system 50 also includes one or more sensors, generally identified in FIG. 2 with numeral 52, arranged on the vehicle 10 in communication with the electronic controller 48, and configured to detect a vehicle dynamic parameter indicative of hydroplaning of the vehicle. Each sensor 52 is also configured to generate a respective signal 54 (shown in FIGS. 1 and 4) indicative of the detected hydroplaning of the vehicle 10. Specifically, as shown in FIG. 1, the system 50 may include front speed sensor(s) 52-1 configured to detect a speed $WS_f$ of the respective front wheel(s) 30 and generate a signal 54-1, and rear speed sensor(s) 52-2 configured to detect a speed $WS_r$ of the respective rear wheel(s) 32 and generate a signal 54-2.

The system 50 also includes the above-described electronic controller 48. The electronic controller 48 is in communication with the at least one sensor 52. As part of the function of the system 50, the electronic controller 48 is configured to receive the signal 54 and determine a target position 56 for a respective adjustable aerodynamic-aid element 44 in response to the detected dynamic parameter. The electronic controller 48 is further configured to set the subject adjustable aerodynamic-aid element 44 to the target position 56 via the respective mechanism 46 to regulate the downforce $F_d$ on the vehicle body 14 and mitigate the hydroplaning of the vehicle 10. A particular embodiment of the dynamic parameter indicative of hydroplaning of the vehicle may be relative speeds of the front and rear wheel(s) 30, 32. Furthermore, relationship between a gradient $G_{Vf}$ or rate of change of the speed of the front wheel(s) 30 and a gradient $G_{Vr}$ of the speed of the rear wheel(s) 32 may be used to assess whether the vehicle 10 has commenced hydroplaning. The relationship between the gradient $G_{Vr}$ and the the gradient $G_{Vr}$ may be indicative of hydroplaning, because during hydroplaning the front wheel(s) 30 enter deep water before the rear wheel(s) 32, and therefore slow down much quicker than the rears do. The electronic controller 48 may be configured to determine the gradient $G_{Vf}$ of the speed of the front wheel(s) 30 and the gradient $G_{Vr}$ of the speed of the rear wheel(s) 32 using the respective signals 54-1, 54-2 from the speed sensor(s) 52-1, 52-2.

The amount of braking force applied to the wheels 30, 32 via the individual friction brakes 42A of the braking system 42, and specifically to the front wheels 30, is a dynamic parameter that may factor into detection of hydroplaning of the vehicle 10. Specifically, another embodiment of the dynamic parameter indicative of hydroplaning of the vehicle may be an amount of brake torque $T_b$ applied to the front wheel(s) 30. The electronic controller 48 may therefore be configured to determine the amount or value of the brake torque $T_b$ applied to the front wheel(s) 30 by the friction brake(s) 42A. Additionally, the electronic controller 48 may set a specific adjustable aerodynamic-aid element 44 to the respective target position 56 when the determined value of brake torque $T_b$ is less than a calibratable brake torque limit $T_{b\text{-}limit}$ programmed into the controller 48 (shown in FIG. 2). The braking system 42 may include an anti-lock braking system (ABS) 60 operation of which may be regulated by the electronic controller 48 (shown in FIG. 2). In such an embodiment, the electronic controller 48 may be configured to set the particular adjustable aerodynamic-aid element 44 to its target position 56 when the ABS 60 is not active.

The electronic controller 48 may also be configured to determine a difference between the gradient $G_{Vf}$ of the speed of the front wheel(s) 30 and the gradient $G_{Vr}$ of the speed of the rear wheel(s) 32. The difference between the wheel speed gradients $G_{Vf}$ and $G_{Vr}$ may be expressed mathematically as "$G_{Vf}-G_{Vr}$". The electronic controller 48 may also be configured to compare the determined difference between the wheel speed gradients $G_{Vf}$ and $G_{Vr}$ to a first calibratable limit value $L_1$ representing a predetermined wheel speed gradient difference. The electronic controller 48 may be further configured to set the subject adjustable aerodynamic-aid element 44 to its target position 56 when the determined difference $G_{Vf}-G_{Vr}$ is greater than the first calibratable limit value $L_1$.

The electronic controller 48 may be additionally configured to determine a proportion or ratio of the gradient $G_{Vf}$ of the speed of the front wheel 30 to the gradient $G_{Vr}$ of the speed of the rear wheel 32, which may be expressed mathematically as "$G_{Vf}/G_{Vr}$". The electronic controller 48 may be additionally configured to compare the determined proportion $G_{Vf}/G_{Vr}$ to a second calibratable limit value $L_2$ representing a predetermined speed gradient proportion. The electronic controller 48 may be further configured to set the subject adjustable aerodynamic-aid element 44 to its target position 56 when the determined proportion $G_{Vf}/G_{Vr}$ is less than the second calibratable limit value $L_2$.

Another embodiment of the dynamic parameter indicative of hydroplaning of the vehicle 10 may be speed V of the vehicle. A relationship between the vehicle speed V and the speed $WS_r$ of the front wheel(s) 30 may be used to assess whether the vehicle 10 has commenced hydroplaning. Specifically, the relationship between the speed V of the vehicle 10 and the speed $WS_f$ may be indicative of hydroplaning, because during hydroplaning the front wheel(s) 30 slow down rapidly upon entering deep water, while the rear wheel(s) 32 are likely to continue to their contact with the road surface 12, and will therefore correlate more closely with vehicle speed. Accordingly, the electronic controller 48 may be configured to determine the speed V of the vehicle 10 and compare the speed $WS_f$ of the front wheel(s) 30 obtained from the signal 54-1 to the determined vehicle speed. Specifically, the electronic controller 48 may determine a difference between the speed $WS_f$ of the front wheel(s) 30 and the determined vehicle speed V, and then divide that determined difference by the determined vehicle speed V, which may be expressed mathematically as "$(WS_f-V)/V$". Furthermore, the electronic controller 48 may be configured to set the subject adjustable aerodynamic-aid element 44 to its target position 56 when the value of the subject determination $(WS_f-V)/V$ is less than a third calibratable limit value $L_3$. Each of the first calibratable limit value $L_1$, second calibratable limit value $L_2$, and third calibratable limit value $L_3$ may be determined empirically during testing and validation of response of the vehicle 10 to onset of hydroplaning and calibration of hydroplaning mitigation via regulation of the aerodynamic-aid element(s) 44.

The electronic controller 48 may be additionally configured to determine the speed V of the vehicle 10 via a mathematical calculation. The determination of speed V may use speeds of the front and rear road wheels 30, 32, detected via specific sensors or using lateral and longitudinal acceleration, vertical acceleration, vehicle yaw rate, depicted in FIG. 1 and generally identified by numeral 62, and drive axle torque $T_d$ (shown in FIG. 3), which may also be determined via dedicated sensors and/or programmed algorithms (not shown). Alternatively, the road speed V of the vehicle 10 may be determined by physical detection. Specifically, the sensor(s) 52 may include a vehicle speed sensor 52-3 configured to determine the road speed V of the vehicle 10. Such a vehicle speed sensor 52-3 may be a pitot tube configured to detect a pressure of the ambient airflow 27 at a specific location relative to the vehicle body 14, and the controller 48 may correlate the measured pressure to airflow velocity. Another embodiment of the vehicle speed sensor 52-3 may be an earth orbiting or global positioning satellite (GPS) configured to detect road speed V of the vehicle 10 and communicate the detected road speed to the electronic controller 48 (not shown). The discussed embodiments of the vehicle speed sensor 52-3 may each communicate the speed V of the vehicle 10 to the electronic controller 48 via respective signals 54-1.

Overall, the above-described regulation of vehicle aerodynamics, and specifically the downforce $F_d$, via the adjustable aerodynamic-aid element(s) 44, is intended to maintain control of the vehicle 10 by countering hydroplaning. The controller 48 may thus be programmed to mitigate hydroplaning of the vehicle 10 by adjusting the position of one or more specific aerodynamic-aid elements 44 via the respective mechanisms 46 in response to the determined dynamic parameter(s). Accordingly, specific aerodynamic-aid element(s) 44 may be employed to press the tires of the front wheels 30 and/or rear wheels 32 through the film of water and into contact with the road surface 12 by increasing the downforce $F_d$ on the vehicle body 14.

Figure 5:
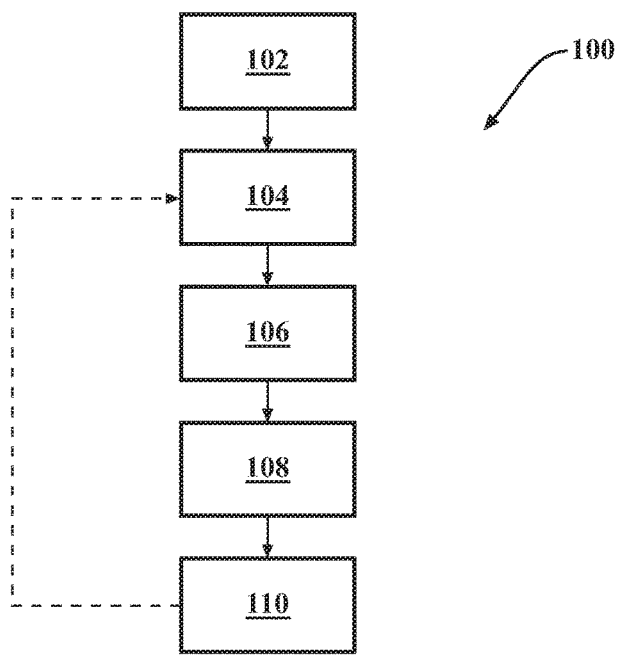
FIG. 5 is a flow chart illustrating a method of mitigating hydroplaning of a vehicle, according to the present disclosure.

FIG. 5 depicts a method 100 of controlling aerodynamics of the vehicle 10 for mitigating hydroplaning of the subject vehicle, as described above with respect to FIGS. 1-4. The method commences in frame 102 with the vehicle 10 proceeding across the road surface 12. After frame 102, the method advances to frame 104, where the method includes detecting vehicle dynamic parameter(s) indicative of the hydroplaning of the vehicle 10 via the sensor(s) 52, e.g., sensors 52-1, 52-2, and 52-3. Following frame 104, the method proceeds to frame 106, where the method includes receiving a respective signal 54 from the individual sensor(s) 52 via the electronic controller 48.

After frame 106, the method advances to frame 108, where it includes determining, via the electronic controller 48, specific target position(s) 56 for the respective adjustable aerodynamic-aid element(s) 44 in response to the detected dynamic parameter. Specifically, and as discussed above with respect to FIGS. 1-4, in frame 108 the method may include determining, via the electronic controller 48, the gradient $G_{Vf}$ of the speed of the front wheel(s) 30 and the gradient $G_{Vr}$ of the speed of the rear wheel(s) 32 using the respective signals 54-1, 54-2 from the speed sensor(s) 52-1, 52-2. Following frame 108, the method advances to frame 110, where it includes setting, via the electronic controller 48, the adjustable aerodynamic-aid element(s) 44 to the respective target position(s) 56 via the mechanism 46 to regulate the downforce $F_d$ on the vehicle body 14 and thereby mitigate the hydroplaning of the vehicle 10.

Additionally, and as discussed above with respect to FIGS. 1-4, in frame 110 the method may include setting specific adjustable aerodynamic-aid element(s) 44 to their respective target position(s) 56 when the determined value of brake torque $T_b$ is less than a calibratable brake torque limit $T_{b\text{-}limit}$. In frame 110 the method may also include setting the particular adjustable aerodynamic-aid element 44 to its target position 56 when the ABS is not active. In frame 110 the method may also include setting the specific adjustable aerodynamic-aid element 44 to its target position 56 when the determined difference $G_{Vf}$-$G_{Vr}$, i.e., between the speed gradient of the front wheel 30 and the speed gradient of the rear wheel 32, is greater than the first calibratable limit value $L_1$.

In frame 110 the method may additionally include setting the specific adjustable aerodynamic-aid element 44 to its target position 56 when the determined proportion $G_{Vf}/G_{Vr}$ is less than the second calibratable limit value $L_2$. In frame 110 the method may further include setting the subject adjustable aerodynamic-aid element 44 to its target position 56 when the value of the subject determination $(WS_f-V)/V$ is less than a third calibratable limit value $L_3$. Following frame 110, the method may loop back to frame 104 to detect, via the sensor(s) 52, vehicle dynamic parameters indicative of hydroplaning of the vehicle 10 and reassess regulation of the aerodynamic-aid element(s) 44 to adjust the downforce $F_d$, and counter the vehicle's hydroplaning.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for mitigation of hydroplaning of a vehicle having a vehicle body arranged along a longitudinal axis and including a first vehicle body end configured to face oncoming ambient airflow, the system comprising:
    an adjustable aerodynamic-aid element mounted to and configured to generate a selectable downforce on the vehicle body in response to a movement of the ambient airflow relative to the vehicle body;
    a mechanism configured to vary a position of the adjustable aerodynamic-aid element relative to the vehicle body and thereby regulate the downforce;
    at least one sensor arranged on the vehicle and configured to detect a vehicle dynamic parameter indicative of the hydroplaning of the vehicle; and
    an electronic controller in communication with the at least one sensor, programmed to regulate the mechanism, and configured to:
        determine an onset of hydroplaning of the vehicle based on the detected dynamic parameter;
        determine a target position for the adjustable aerodynamic-aid element in response to the detected dynamic parameter; and
        set the adjustable aerodynamic-aid element to the target position via the mechanism to regulate the downforce on the vehicle body and mitigate the hydroplaning of the vehicle;
    wherein:
        the vehicle includes a front wheel and a rear wheel and a braking system configured to retard rotation of the front and rear wheels;
        the at least one sensor includes:
            a front speed sensor in communication with the electronic controller and configured to detect a speed of the front wheel; and
            a rear speed sensor in communication with the electronic controller and configured to detect a speed of the rear wheel;
        the electronic controller is configured to:
            determine a gradient of the speed of the front wheel and a gradient of the speed of the rear wheel; and
            determine a value of brake torque applied to the front wheel by the braking system and set the adjustable aerodynamic-aid element to the target position when the determined value of brake torque is less than a calibratable brake torque limit.

2. The system according to claim 1, wherein the braking system includes an anti-lock braking system (ABS), and wherein the electronic controller is configured to set the adjustable aerodynamic-aid element to the target position when the ABS is not active.

3. The system according to claim 1, wherein the electronic controller is additionally configured to:
    determine a difference between the gradient of the speed of the front wheel and the gradient of the speed of the rear wheel;
    compare the determined difference between the gradient of the speed of the front wheel and the gradient of the speed of the rear wheel to a first calibratable limit value; and
    set the adjustable aerodynamic-aid element to the target position when the determined difference between the gradient of the speed of the front wheel and the gradient of the speed of the rear wheel is greater than the first calibratable limit value.

4. The system according to claim 1, wherein the electronic controller is additionally configured to:
    determine a proportion of the gradient of the speed of the front wheel to the gradient of the speed of the rear wheel;
    compare the determined proportion of the gradient of the speed of the front wheel to the gradient of the speed of the rear wheel to a second calibratable limit value; and
    set the adjustable aerodynamic-aid element to the target position when the determined proportion of the gradient of the speed of the front wheel to the gradient of the speed of the rear wheel is less than the second calibratable limit value.

5. The system according to claim 1, wherein the electronic controller is additionally configured to:
    determine a speed of the vehicle;
    determine a difference between the speed of the front wheel and the determined vehicle speed, and divide the determined difference between the speed of the front wheel and the determined vehicle speed by the determined vehicle speed to establish a front wheel speed to vehicle speed comparison value; and
    set the adjustable aerodynamic-aid element to the target position when the established front wheel speed to vehicle speed comparison value is less than a third calibratable limit value.

6. A vehicle comprising:
    a vehicle body arranged along a longitudinal axis and having a first vehicle body end configured to face oncoming ambient airflow;

a front wheel and a rear wheel;
an adjustable aerodynamic-aid element mounted to and configured to generate a selectable downforce on the vehicle body in response to a movement of the ambient airflow relative to the vehicle body;
a mechanism configured to vary a position of the adjustable aerodynamic-aid element relative to the vehicle body and thereby regulate the downforce;
at least one sensor arranged on the vehicle and configured to detect a vehicle dynamic parameter indicative of hydroplaning of the vehicle, wherein the at least one sensor includes:
  a front speed sensor in communication with the electronic controller and configured to detect a speed of the front wheel; and
  a rear speed sensor in communication with the electronic controller and configured to detect a speed of the rear wheel; and
an electronic controller in communication with the at least one sensor and programmed to regulate the mechanism and configured to:
  determine an onset of hydroplaning of the vehicle based on the detected dynamic parameter;
  determine a target position for the adjustable aerodynamic-aid element in response to the detected dynamic parameter;
  set the adjustable aerodynamic-aid element to the target position (thereof) via the mechanism to regulate the downforce on the vehicle body and mitigate the hydroplaning of the vehicle;
  determine a gradient of the speed of the front wheel and a gradient of the speed of the rear wheel;
  determine a proportion of the gradient of the speed of the front wheel to the gradient of the of the speed of the rear wheel;
  compare the determined proportion of the gradient of the speed of the front wheel to the gradient of the of the speed of the rear wheel to a second calibratable limit value; and
  set the adjustable aerodynamic-aid element to the target position when the determined proportion of the gradient of the speed of the front wheel to the gradient of the of the speed of the rear wheel is less than the second calibratable limit value.

7. The vehicle according to claim 6, further comprising a braking system configured to retard rotation of the front and rear wheels, wherein the electronic controller is configured to determine a value of brake torque applied to the front wheel by the braking system and set the adjustable aerodynamic-aid element to the target position when the determined value of brake torque is less than a calibratable brake torque limit.

8. The vehicle according to claim 7, wherein the braking system includes an anti-lock braking system (ABS), and wherein the electronic controller is configured to set the adjustable aerodynamic-aid element to the target position when the ABS is not active.

9. The vehicle according to claim 6, wherein the electronic controller is additionally configured to:
  determine a difference between the gradient of the speed of the front wheel and the gradient of the speed of the rear wheel;
  compare the determined difference between the gradient of the speed of the front wheel and the gradient of the speed of the rear wheel to a first calibratable limit value; and
  set the adjustable aerodynamic-aid element to the target position when the determined difference between the gradient of the speed of the front wheel and the gradient of the speed of the rear wheel is greater than the first calibratable limit value.

10. The vehicle according to claim 6, wherein the electronic controller is additionally configured to:
  determine a speed of the vehicle;
  determine a difference between the speed of the front wheel and the determined vehicle speed, and divide the determined difference between the speed of the front wheel and the determined vehicle speed by the determined vehicle speed to establish a front wheel speed to vehicle speed comparison value; and
  set the adjustable aerodynamic-aid element to the target position when the established front wheel speed to vehicle speed comparison value is less than a third calibratable limit value.

11. A method of mitigating of hydroplaning of a vehicle having a vehicle body arranged along a longitudinal axis, a front wheel and a rear wheel, a braking system with an anti-lock braking system (ABS) configured to retard rotation of the front and rear wheels, and including a first vehicle body end configured to face oncoming ambient airflow, the method comprising:
  detecting a vehicle dynamic parameter indicative of the hydroplaning of the vehicle via at least one sensor arranged on the vehicle, wherein the at least one sensor includes:
    a front speed sensor in communication with the electronic controller and configured to detect a speed of the front wheel; and
    a rear speed sensor in communication with the electronic controller and configured to detect a speed of the rear wheel;
  receiving a signal from the at least one sensor indicative of the detected hydroplaning of the vehicle via an electronic controller programmed to regulate a mechanism configured to vary a position of an adjustable aerodynamic-aid element mounted to and configured to generate a selectable downforce on the vehicle body in response to a movement of the ambient airflow relative to the vehicle body;
  determining an onset of hydroplaning of the vehicle based on the detected dynamic parameter;
  determining, via the electronic controller, a target position for the adjustable aerodynamic-aid element in response to the detected dynamic parameter;
  determining, via the electronic controller, a gradient of the speed of the front wheel and a gradient of the speed of the rear wheel;
  determining, via the electronic controller, a value of brake torque applied to the front wheel by the braking system and setting the adjustable aerodynamic-aid element to the target position when the determined value of brake torque is less than a calibratable brake torque limit; and
  setting, via the electronic controller, the adjustable aerodynamic-aid element to the target position via the mechanism when the ABS is not active to regulate the downforce on the vehicle body and thereby mitigate the hydroplaning of the vehicle.

12. The method according to claim 11, further comprising:
  determining, via the electronic controller, a difference between the gradient of the speed of the front wheel and the gradient of the speed of the rear wheel;

comparing, via the electronic controller, the determined difference between the gradient of the speed of the front wheel and the gradient of the speed of the rear wheel to a first calibratable limit value; and setting, via the electronic controller, the adjustable aerodynamic-aid element to the target position when the determined difference between the gradient of the speed of the front wheel and the gradient of the speed of the rear wheel is greater than the first calibratable limit value.

13. The method according to claim 11, further comprising:

determining, via the electronic controller, a proportion of the gradient of the speed of the front wheel to the gradient of the speed of the rear wheel;

comparing, via the electronic controller, the determined proportion of the gradient of the speed of the front wheel to the gradient of the speed of the rear wheel to a second calibratable limit value; and setting, via the electronic controller, the adjustable aerodynamic-aid element to the target position when the determined proportion of the gradient of the speed of the front wheel to the gradient of the speed of the rear wheel is less than the second calibratable limit value.

14. The method according to claim 11, further comprising:

determining, via the electronic controller, a speed of the vehicle;

determining a difference between the speed of the front wheel and the determined vehicle speed, and dividing the determined difference between the speed of the front wheel and the determined vehicle speed by the determined vehicle speed to establish a front wheel speed to vehicle speed comparison value; and setting the adjustable aerodynamic-aid element to the target position when the established front wheel speed to vehicle speed comparison value is less than a third calibratable limit value.

* * * * *